(12) United States Patent
Tu

(10) Patent No.: US 11,562,145 B2
(45) Date of Patent: Jan. 24, 2023

(54) TEXT CLASSIFICATION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventor: Run Tu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 316 days.

(21) Appl. No.: 16/885,237

(22) Filed: May 27, 2020

(65) Prior Publication Data
US 2020/0293720 A1 Sep. 17, 2020

Related U.S. Application Data

(63) Continuation of application No. PCT/CN2019/073802, filed on Jan. 30, 2019.

(30) Foreign Application Priority Data

Feb. 1, 2018 (CN) .......................... 201810103251.0

(51) Int. Cl.
*G06F 40/00* (2020.01)
*G06F 40/30* (2020.01)
(Continued)

(52) U.S. Cl.
CPC ............ *G06F 40/30* (2020.01); *G06F 40/242* (2020.01); *G06F 40/289* (2020.01); *G06N 3/04* (2013.01); *G06N 3/08* (2013.01)

(58) Field of Classification Search
CPC ...... G06F 40/30; G06F 40/242; G06F 40/289; G06F 40/284; G06F 16/35; G06N 3/04; G06N 3/08; G06N 3/0481; G06N 3/0454
See application file for complete search history.

(56) References Cited

FOREIGN PATENT DOCUMENTS

| CN | 1403959 A | * | 3/2003 | ....... G06F 17/30867 |
| CN | 103886097 A | | 6/2014 | |

(Continued)

OTHER PUBLICATIONS

Haowei Zhang, Jin Wang, Jixian Zhang, and Xuejie Zhang. 2017. YNU-HPCC at SemEval 2017 Task 4: Using A Multi-Channel CNN-LSTM Model for Sentiment Classification. In Proceedings of the 11th International Workshop on Semantic Evaluation (SemEval-2017), pp. 796-801, Vancouver, Canada. (Year: 2017).*

(Continued)

*Primary Examiner* — Edgar X Guerra-Erazo
*Assistant Examiner* — Philip H Lam
(74) *Attorney, Agent, or Firm* — Anova Law Group, PLLC

(57) ABSTRACT

This application relates to a text classification method. The method includes obtaining, by a computer device, a to-be-classified text, and calculating an original text vector corresponding to the text; determining, by the computer device according to the original text vector, an input text vector corresponding to each channel of a trained text classification model; inputting, by the computer device, the input text vector corresponding to each channel into a convolution layer of the corresponding channel of the trained text classification model, the trained text classification model comprising a plurality of channels, each channel being corresponding to a sub-text classification model, and the trained text classification model being used for determining a classification result according to a sub-classification parameter outputted by each sub-text classification model; and obtaining, by the computer device, a classification result outputted by the trained text classification model, and classifying the text according to the classification result.

11 Claims, 12 Drawing Sheets

(51) Int. Cl.
*G06F 40/289* (2020.01)
*G06F 40/242* (2020.01)
*G06N 3/04* (2006.01)
*G06N 3/08* (2006.01)

(56) References Cited

FOREIGN PATENT DOCUMENTS

| | | | | |
|---|---|---|---|---|
| CN | 103995876 A | * | 8/2014 | ....... G06F 17/30705 |
| CN | 104850540 A | | 8/2015 | |
| CN | 105045924 A | * | 11/2015 | ........... G06F 16/353 |
| CN | 105740349 A | | 7/2016 | |
| CN | 106649275 A | | 5/2017 | |
| CN | 107092679 A | * | 8/2017 | ......... G06F 16/3334 |
| CN | 107169086 A | * | 9/2017 | ............. G06F 16/35 |
| CN | 107180023 A | | 9/2017 | |
| CN | 107239443 A | * | 10/2017 | |
| CN | 107247703 A | | 10/2017 | |
| CN | 107301246 A | * | 10/2017 | ........... G06F 16/353 |
| CN | 107301248 A | * | 10/2017 | ........... G06F 16/355 |
| CN | 107644074 A | | 1/2018 | |
| CN | 107644074 A | * | 1/2018 | ............ G06F 17/30 |
| CN | 108334605 A | | 7/2018 | |
| JP | 2012079121 A | * | 4/2012 | |
| WO | WO-2011096969 A1 | * | 8/2011 | ........... G06F 16/353 |

OTHER PUBLICATIONS

Yin, Wenpeng, and Hinrich Schütze. "Multichannel variable-size convolution for sentence classification." arXiv preprint arXiv: 1603.04513 (2016). (Year: 2016).*

Yoon, J., & Kim, H. (2017, November). Multi-channel lexicon integrated CNN-BiLSTM models for sentiment analysis. In Proceedings of the 29th conference on computational linguistics and speech processing (ROCLING 2017) (pp. 244-253). (Year: 2017).*

Yoon Kim. 2014. Convolutional Neural Networks for Sentence Classification. In Proceedings of the 2014 Conference on Empirical Methods in Natural Language Processing (EMNLP), pp. 1746-1751, Doha, Qatar. Association for Computational Linguistics. (Year: 2014).*

Johnson, Rie and Tong Zhang. "Effective Use of Word Order for Text Categorization with Convolutional Neural Networks." NAACL (2015). (Year: 2015).*

The World Intellectual Property Organization (WIPO) International Search Report for PCT/CN2019/073802 dated May 13, 2019 7 Pages (including translation).

The State Intellectual Property Office of the People's Republic of China (SIPO) Office Action 1 for 201810103251.0 dated May 17, 2019 8 Pages (including translation).

* cited by examiner

First feature matrix        Bias matrix

TEXT CLASSIFICATION METHOD, COMPUTER DEVICE, AND STORAGE MEDIUM

RELATED APPLICATIONS

This application claims priority to PCT Application No. PCT/CN2019/073802 filed on Jan. 30, 2019, which claim the priority of Chinese Patent Application No. 2018101032510, entitled "TEXT CLASSIFICATION METHOD AND APPARATUS, COMPUTER DEVICE, AND STORAGE MEDIUM" filed with the China National Intellectual Property Administration on Feb. 1, 2018, which are both incorporated herein by reference in their entirety.

FIELD OF THE TECHNOLOGY

This application relates to the field of computer processing technologies, and in particular, to a text classification method, a computer device, and a storage medium.

BACKGROUND OF THE DISCLOSURE

Text classification refers to classifying a collected text according to a classification intention. Conventional text classification refers to manually classifying a text grabbed by an Internet crawler. This method requires heavy workload and is difficult to ensure accuracy. With the development of machine learning, some topic models, such as Latent Dirichlet Allocation (LDA), are put forward for text classification. However, the classification result is still not accurate.

SUMMARY

According to embodiments provided in this application, a text classification method, a computer device, and a storage medium are provided. One aspect of the present disclosure provides a text classification method. The method includes obtaining, by a computer device, a to-be-classified text, and calculating an original text vector corresponding to the text; determining, by the computer device according to the original text vector, an input text vector corresponding to each channel of a trained text classification model. The trained text classification model is obtained through training by using a convolutional neural network (CNN) model, and the sub-text classification model comprises a convolutional layer, a pooling layer, and an output layer. The method further includes inputting, by the computer device, the input text vector corresponding to each channel into the convolution layer of the corresponding channel of the trained text classification model, the trained text classification model comprising a plurality of channels, each channel being corresponding to a sub-text classification model, and the trained text classification model being used for determining a classification result according to a sub-classification parameter outputted by each sub-text classification model; and obtaining, by the computer device, a classification result outputted by the trained text classification model, and classifying the text according to the classification result.

Another aspect of the present disclosure provides a computer device. The computer device includes a memory and a processor, the memory storing computer-readable instructions, the computer-readable instructions, when executed by the processor, causing the processor to perform the following operations: obtaining a to-be-classified text, and calculating an original text vector corresponding to the text; determining, according to the original text vector, an input text vector corresponding to each channel of a trained text classification model. The trained text classification model is obtained through training by using a convolutional neural network (CNN) model, and the sub-text classification model comprises a convolutional layer, a pooling layer, and an output layer. The operations further include inputting the input text vector corresponding to each channel into the corresponding channel of the convolution layer of the trained text classification model, the trained text classification model comprising a plurality of channels, each channel being corresponding to a sub-text classification model, and the trained text classification model being used for determining a classification result according to a sub-classification parameter outputted by each sub-text classification model; and obtaining a classification result outputted by the trained text classification model, and classifying the text according to the classification result.

Another aspect of the present disclosure provides a computer readable storage medium. The computer readable storage medium storing a computer-readable instruction, the computer-readable instruction, when executed by one or more processors, causing the one or more processors to perform the following operations: obtaining a to-be-classified text, and calculating an original text vector corresponding to the text; and determining, according to the original text vector, an input text vector corresponding to each channel of a trained text classification model. The trained text classification model is obtained through training by using a convolutional neural network (CNN) model, and the sub-text classification model comprises a convolutional layer, a pooling layer, and an output layer. The operations further include inputting the input text vector corresponding to each channel into the corresponding channel of the trained text classification model, the trained text classification model comprising a plurality of channels, each channel being corresponding to a sub-text classification model, and the trained text classification model being used for determining a classification result according to a sub-classification parameter outputted by each sub-text classification model; and obtaining a classification result outputted by the trained text classification model, and classifying the text according to the classification result.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It is to be understood that the specific embodiments described herein are merely used for explaining this application, and are not used for limiting this application.

This application is further described in detail below with reference to the accompanying drawings and embodiments.

Figure 1:
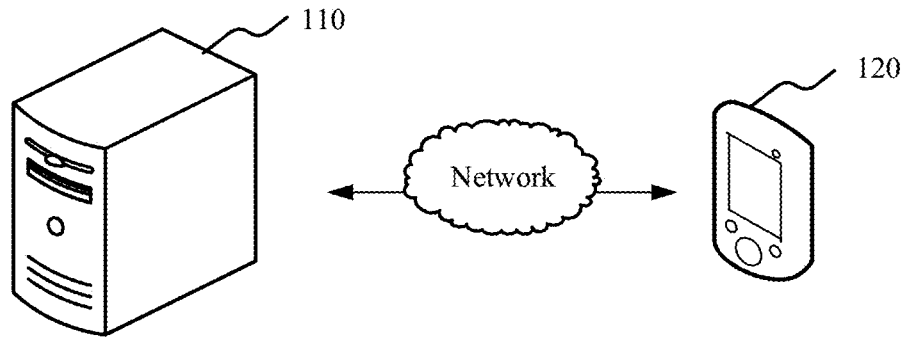
FIG. 1 is a diagram of an application environment of a text classification method according to an embodiment.

FIG. 1 is a diagram of an application environment of a text classification method according to an embodiment of the present disclosure. Referring to FIG. 1, the text classification method is applied to a text classification system. The text classification system includes a server 110 and a terminal 120. The server 110 is connected to the terminal 120 by using a network. The server 110 may be implemented by using an independent server or a server cluster that includes a plurality of servers. The terminal 120 may be specifically a desktop terminal or a mobile terminal, and the mobile terminal may be specifically at least one of a mobile phone, a tablet computer, a notebook computer, and the like. Specifically, the server 110 obtains a to-be-classified text, and calculates an original text vector corresponding to the text; determines, according to the original text vector, an input text vector corresponding to each channel of a trained text classification model; inputs the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model; and obtains a classification result outputted by the text classification model, classifies the text according to the classification result, and then sends a result of the classification to the terminal 120.

Figure 2:
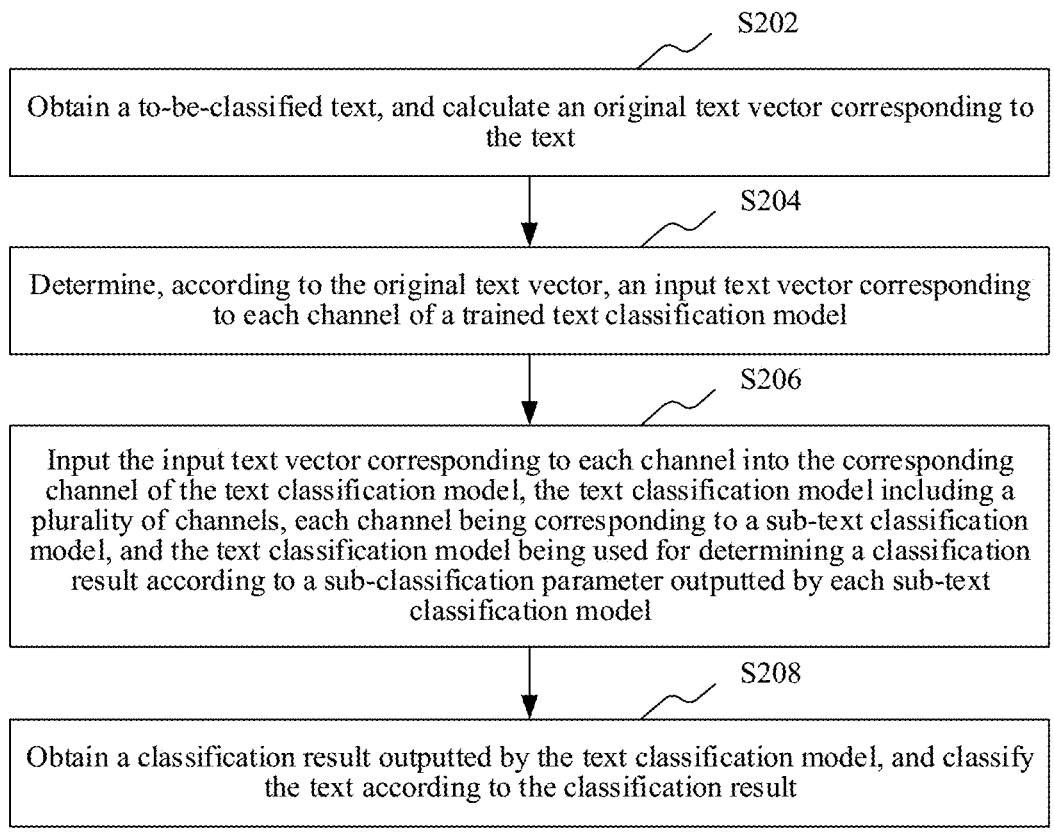
FIG. 2 is a flowchart of a text classification method according to an embodiment.

As shown in FIG. 2, in one embodiment, a text classification method is provided. This embodiment is described by using an example in which the method is applied to the server 110 in FIG. 1. Referring to FIG. 2, the text classification method specifically includes the following steps:

Step S202: Obtain a to-be-classified text, and calculate an original text vector corresponding to the text.

The to-be-classified text refers to a text that needs to be classified. The text vector refers to converting a text into a representation form of a vector. The text refers to a representation form of a written language, and is applicable to all languages. In one embodiment, the server first needs to perform word segmentation on the to-be-classified text, to obtain a plurality of phrases. The word segmentation refers to segmenting a word sequence into individual phrases. The server then calculates a word vector corresponding to each phrase, and finally determines the original text vector corresponding to the text according to the word vector corresponding to each phrase. As the text is formed by the phrases, the text vector is formed by word vectors. The word vector may be obtained through calculation by using calculation methods such as a bag-of-words model or a word2vec model. The word2vec model is an efficient tool representing the phrase as a real-value vector, which can simplify processing of text content as a vector operation in a k-dimensional vector space through training by using an idea of deep learning. A similarity in the vector space may be used to indicate a similarity between semantic meanings in the text.

Step S204: Determine, according to the original text vector, an input text vector corresponding to each channel of a trained text classification model.

The trained text classification model refers to a trained model for predicting a text class. The text classification model includes a plurality of channels, and each channel corresponds to a sub-text classification model. The input text vector of each channel is determined according to the original text vector obtained through calculation. In one embodiment, there is only one original text vector obtained through calculation, and in this case, the same original text vector may be used as the input text vector of each channel. In another embodiment, there are a plurality of original text vectors obtained through calculation, different original text vectors may be respectively used as input text vectors of different channels. In any manner, a model training process and a prediction process need to be consistent in the method for determining an input text vector. That is, if one input text vector is used by all the channels when the text classification model is trained, only one input text vector can be used by all the channels during the prediction process, and the text vector is obtained through calculation by using the same word vector model, that is, the training and the prediction are consistent.

Step S206: Input the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model.

The text classification model includes a plurality of channels, and the channels are parallel to each other. Each channel corresponds to a sub-text classification model. Alternatively, it may be understood as that each channel is a sub-text classification model. The sub-text classification model is used for performing preliminary category prediction on the text. The text classification model is used for integrating sub-classification parameters outputted by the sub-text classification models, that is, determining a final classification result of text classification by synthesizing the preliminary category prediction of the sub-text classification models. Specifically, the input text vector corresponding to each channel is used as an input of the corresponding channel in the text classification model. The text classification model obtains the sub-classification parameter outputted by each channel, and then determines a final prediction result by synthesizing the sub-classification parameters corresponding to the sub-text classification models. In one embodiment, the text classification model is obtained through training by using a convolutional neural network (CNN) model. In another embodiment, the text classification model may alternatively be obtained through training by using a recurrent neural network (RNN) model.

Step S208: Obtain a classification result outputted by the text classification model, and classify the text according to the classification result.

The text classification model is used for predicting a category of the text, outputting a classification result. The text is classified according to the classification result. The text classification model obtains a final classification result through calculation by synthesizing the sub-classification parameters outputted by the sub-text classification models. Compared with a conventional classification method, use of the multi-channel text classification model can greatly improve classification accuracy.

In the foregoing text classification method, a to-be-classified text is obtained, and then an original text vector corresponding to the text is calculated; an input text vector corresponding to each channel of a trained text classification model is determined according to the original text vector; then the input text vector is input into the corresponding channel of the text classification model, each channel being corresponding to a sub-text classification model, and the text classification model being used for determining a classification result according to a sub-classification parameter outputted by each sub-text classification model; and then the text is classified according to the classification result. In the text classification method, the multi-channel text classification model is used, and the final classification result is determined by synthesizing sub-classification parameters outputted by all the channels, thereby helping improve classification accuracy.

Figure 3:
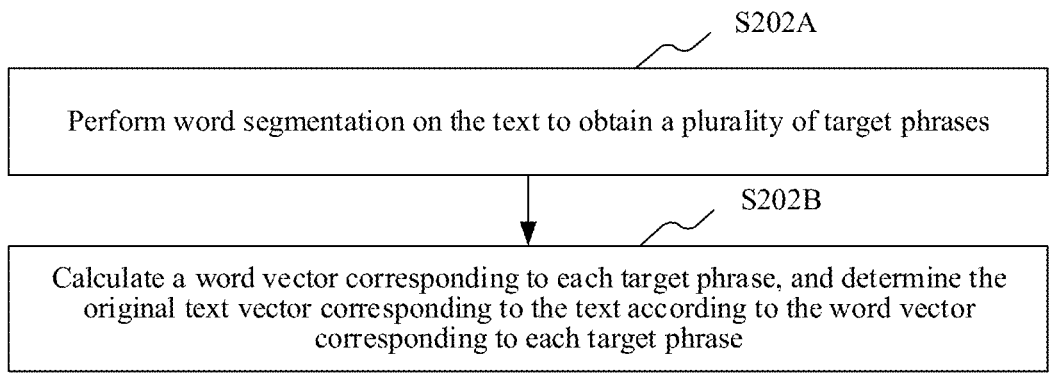
FIG. 3 is a flowchart of calculating an original text vector corresponding to a text according to an embodiment.

As shown in FIG. 3, in one embodiment, step S202 of calculating an original text vector corresponding to the text includes:

Step S202A: Perform word segmentation on the text to obtain a plurality of target phrases.

The word segmentation refers to segmenting a word sequence into individual phrases. A Jieba text segmentation method may be used as the processing method of word segmentation. In one embodiment, word segmentation may be performed on the text according to semantic meanings in the text, and an obtained phrase may be a phrase including only one word, or may be a phrase including two words, or certainly, may be a phrase including three words, four words, or the like. In another embodiment, to avoid that a phrase is not included in a corpus, modeling of a word vector may be performed only on single words when modeling is performed. In this case, when word segmentation is performed, the text is directly segmented into words, and subsequently a word vector corresponding to each word is directly obtained. In one embodiment, before word segmentation is performed on the text, the text is further preprocessed. The preprocessing includes converting a traditional font word in the text into a simplified font word. In another embodiment, after word segmentation is performed on the text, further processing needs to be performed. For example, stopwords such as exclamations and useless characters in the phrases obtained after word segmentation are removed. Specifically, a stopword list may be created in advance, corresponding stopwords are removed by comparing the phrases obtained after word segmentation with stopwords in the stopword list, and then final target phrases are determined.

Step S202B: Calculate a word vector corresponding to each target phrase, and determine the original text vector corresponding to the text according to the word vector corresponding to each target phrase.

After word segmentation is performed on the to-be-classified text, a plurality of target phrases are obtained. Then, a word vector corresponding to each target phrase is calculated. After the word vector corresponding to each target phrase is obtained through calculation, the original text vector corresponding to the text can be obtained. The original text vector is a combination of word vectors in order. There are a plurality of methods for calculating a word vector corresponding to a target phrase. For example, the bag-of-words model may be used, or the word2vec model may be used.

In one embodiment, after the step of performing word segmentation on the text to obtain a plurality of target phrases, the method further includes: obtaining a filter dictionary, and filtering out the text if none of the plurality of target phrases is a phrase in the filter dictionary; or performing the step of calculating a word vector corresponding to each target phrase if at least one of the plurality of target phrases is a phrase in the filter dictionary.

The filter dictionary is used for screening an obtained text. When data is grabbed from a web page by using a crawler, a lot of non-target data is usually grabbed. The non-target data is data irrelevant to a classification intention. For example, a user wants to classify a character in a game, and if obtained data is irrelevant to the game, it indicates that the data is non-target data. To screen out the non-target data, the obtained corpus data (that is, text) is screened by using the filter dictionary, to screen out target non-target data. Only the target data needs to be classified subsequently, and non-target data is directly excluded. The filter dictionary is obtained by collecting term frequency (TF) statistics on valid samples and selecting TOP N phrases (with phrase frequencies ranking the first N places) as phrases in the filter dictionary. If none of the plurality of target phrases obtained through word segmentation is a phrase in the filter dictionary, the text is a non-target text, and is directly filtered out. If at least one of the plurality of target phrases is a phrase in the filter dictionary, it indicates that the text is a target text, and the target text needs to be classified, and therefore, the step of calculating a word vector corresponding to each target phrase is performed. After a text is obtained, the obtained text is first cleaned by using the filter dictionary, and a non-target text is filtered out, thereby significantly reducing noise data.

Figure 4:
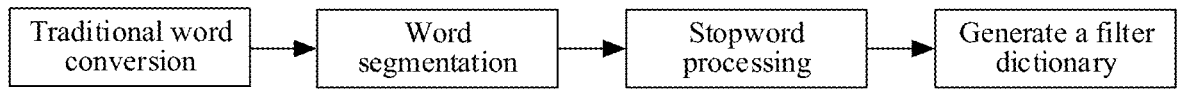
FIG. 4 is a schematic flowchart of preprocessing a text according to an embodiment.

FIG. 4 is a schematic flowchart of preprocessing a text according to an embodiment. After data is grabbed form a web page by using a crawler, first, traditional font words included in a grabbed text are all converted into simplified font words. Then word segmentation is performed on the text to obtain a plurality of phrases. Next, a created stopword list is used to remove stopwords and screen out a plurality of target phrases. Then the target phrases are compared with phrases in a filter dictionary. If none of the target phrases is a phrase in the filter dictionary, it indicates that the text is a non-target text, and the text is directly filtered out without further processing. If at least one of the target phrases is a phrase in the filter dictionary, the text is used as a to-be-classified target text, and the step of calculating a word vector corresponding to each target phrase is performed.

In one embodiment, the text classification model includes a first channel and a second channel. Step S202B of calculating a word vector corresponding to each target phrase, and determining the original text vector corresponding to the text according to the word vector corresponding to each target phrase includes: obtaining through calculation by using a first word vector model, a first word vector corresponding to each target phrase, and incorporating the first word vector to generate a first original text vector; and obtaining through calculation by using a second word vector model, a second word vector corresponding to each target phrase, and incorporating the second word vector to generate a second original text vector.

The text classification model includes two channels: a first channel and a second channel. The first channel corresponds to a first sub-text classification model, and the second channel corresponds to a second sub-text classification model. There are a plurality of models for calculating a word vector. A first word vector corresponding to each target phrase is obtained through calculation by using a first word vector model, and then a combination is performed according to the first word vector to generate a first original text vector. The second word vector model is different from the first word vector model. A second word vector corresponding to each target phrase is calculated by using the second word vector model, and then a combination is performed according to the second word vector corresponding to each target phrase to generate a second original text vector. The text vector is a combination of a plurality of word vectors.

In one embodiment, the bag-of-words model may be used as the first word vector model, and the word2vec model may be used as the second word vector model. The bag-of-words model determines a text vector by counting occurrence frequencies of phrases, which cannot represent a similarity between different phrases, while the word2vec model can identify different phrases with similar meanings. By using the first word vector obtained by using the bag-of-words model as an input of the first channel and using the second word vector obtained by using the word2vec model as an input of the second channel, advantages of the two models can be combined to complement each other, so that classification accuracy of the text classification model is higher.

Step S204 of determining, according to the original text vector, an input text vector corresponding to each channel of a trained text classification model includes: using the first original text vector as an input text vector of the first channel, and using the second original text vector as an input text vector of the second channel.

Different text vectors obtained are respectively input into different channels in the text classification model. The first original text vector is input into the first channel of the text classification model, and the second original text vector is input into the second channel of the text classification model. The text is converted into different word vector representation forms by using different word vector models, and then are respectively input into different channels for parallel processing. Subsequently, a final classification result is obtained by synthesizing sub-classification parameters outputted by the two channels. By synthesizing advantages of different word vector models, the text classification model can obtain a more accurate classification result.

Figure 5:
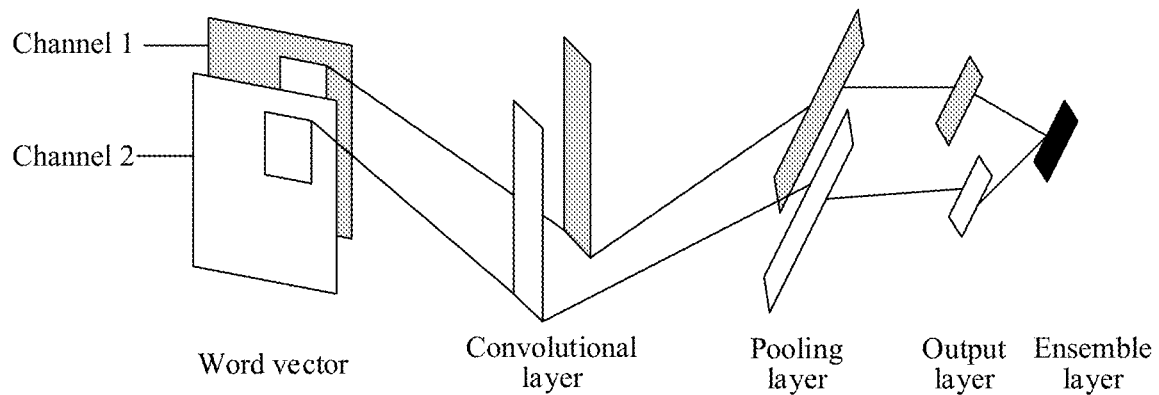
FIG. 5 is a schematic diagram of models of two channels according to an embodiment.

FIG. 5 is a schematic diagram of models of two channels according to an embodiment. The two channels are parallel to each other, and each include a convolutional layer, a pooling layer, and an output layer. Finally, integration calculation is performed on outputs of the two channels by using an ensemble layer, to obtain a final classification result. By using the text classification model, classification accuracy can be improved. Moreover, because each channel uses a simple network structure of only one convolutional layer, one pooling layer, and one output layer, operation difficulty is greatly reduced, and a classification speed is increased.

In one embodiment, the step of obtaining through calculation by using a first word vector model, a first word vector corresponding to each target phrase, and incorporating the first word vector to generate a first original text vector includes: constructing a dictionary including the plurality of target phrases, and determining, according to a quantity of times that each target phrase appears in the text, the first word vector of the target phrase; and determining, according to a location of each target phrase in the dictionary and the first word vector of each target phrase, the first original text vector corresponding to the text.

After the text is segmented to obtain a plurality of target phrases, a dictionary including the plurality of target phrases is constructed, then a quantity of times that each target phrase appears in the text is counted, and then a first word vector corresponding to the target phrase is determined according to the quantity of times. For example, assuming that the phrase "gold" appears twice in the text, a vector corresponding to "gold" is represented as "2". After the first word vector corresponding to each target phrase is determined, the first original text vector corresponding to the text is determined according to a location of the target phrase in the dictionary and the first word vector corresponding to the target phrase. For example, assuming that target phrases obtained after text segmentation include {"game name", gold, "game character name", how, level, item builds, how, gold}, a generated dictionary is {1. "game name"; 2. gold; 3. level; 4. "game character name"; 5. how; 6. item builds}, and a corresponding generated first original text vector is represented as [1, 2, 1, 1, 2, 1]. The vector is irrelevant to an order at which each phrase appears in the original text; instead, the vector is determined according to a frequency at which each phrase in the dictionary appears in the text.

In one embodiment, the step of obtaining through calculation by using a second word vector model, a second word vector corresponding to each target phrase, and incorporating the second word vector to generate a second original text vector includes: obtaining a word vector library corresponding to the second word vector model, and obtaining, from the word vector library, the second word vector corresponding to each target phrase; and constructing, according to the second word vector corresponding to each target phrase, the second original text vector corresponding to the text.

A word vector corresponding to each target phrase is recorded in the word vector library, which is referred to as a "second word vector" for distinguishing. The word vector can reflect a similarity between phrases. The second word vector model may be the word2vec model. For example, a word vector of the phrase "gold" may be represented as {0.12, 0.5, 0.23, 0.49, 0.01}. After the second word vector corresponding to each target phrase is determined, the plurality of second word vectors are combined according to a location order of the phrases in the text to generate the second original text vector.

In another embodiment, for dimensional consistency between the first original text vector and the second original text vector, the first original text vector may be multiplied by a unit vector to be converted into a vector having the same dimension as the second original text vector. For example, assuming that the first original text vector is a 128*1 dimensional matrix, and the second original text vector is a 128*320 matrix, a 128*320 dimensional matrix can be obtained by multiplying the first original text vector by a 1*320 dimensional matrix.

Figure 6:
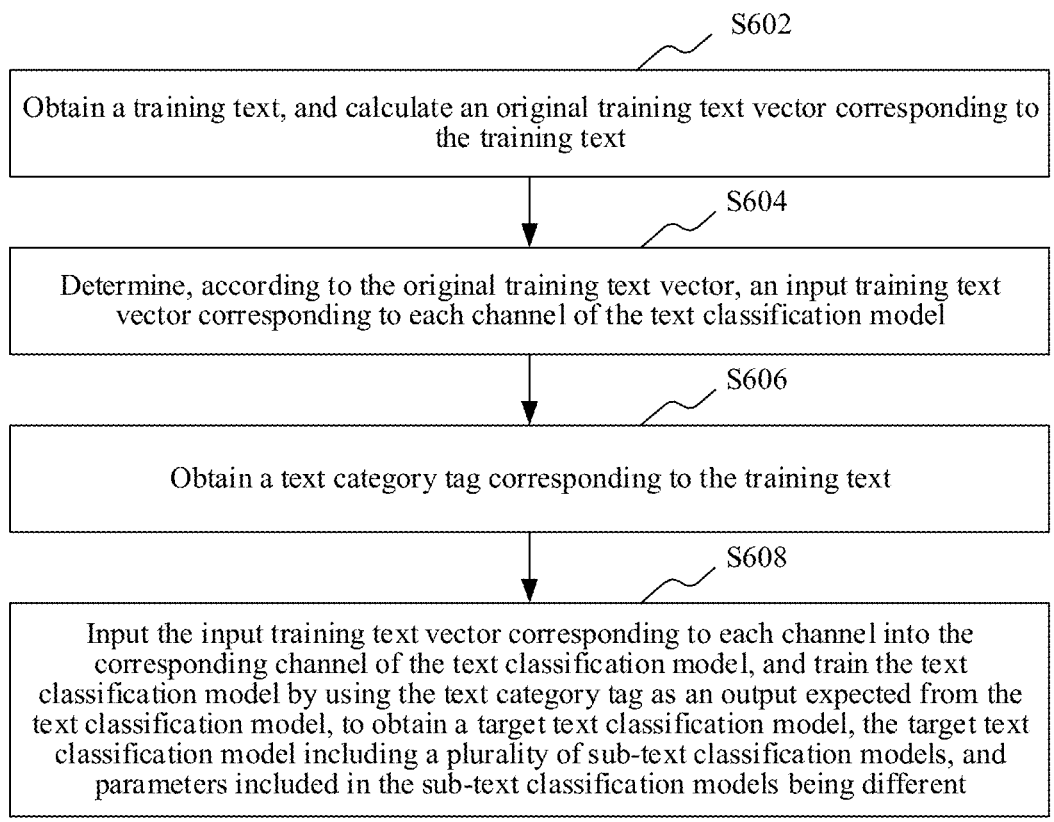
FIG. 6 is a flowchart of a method for training a text classification model according to an embodiment.

As shown in FIG. 6, in one embodiment, before the step of using the text vector as an input of each channel of the text classification model, and obtaining a sub-classification parameter outputted by each channel, the method further includes: training the text classification model. The training the text classification model specifically includes the following steps:

Step S602: Obtain a training text, and calculate an original training text vector corresponding to the training text.

Before the text classification model is used, the text classification model needs to be trained first. A training text in a training text set is obtained, and then an original training text vector corresponding to the training text is obtained. First, word segmentation is performed on the training text to obtain a target training phrase, then a word vector corresponding to the target training phrase is obtained through calculation according to a word vector model, and then an original training text vector corresponding to the training text is determined according to the word vector.

Step S604: Determine, according to the original training text vector, an input training text vector corresponding to each channel of the text classification model.

The to-be-trained text classification model includes a plurality of channels, and each channel corresponds to a sub-text classification model. Sub-text classification models of all the channels need to be trained simultaneously. Therefore, input training text vectors corresponding to all the channels need to be determined simultaneously. The input training text vectors corresponding to all the channels may be the same, or may be different. In any manner, training and use need to be consistent. That is, if different input training text vectors are used during training, different input training text vectors also need to be input when the trained text classification model is used for prediction.

Step S606: Obtain a text category tag corresponding to the training text.

Category tagging needs to be performed on the training text in advance. Generally, the training text is tagged manually, so that the text classification model is trained by using the tagged category as a category that is desired to be outputted.

Step S608: Input the input training text vector corresponding to each channel into the corresponding channel of the text classification model, and train the text classification model by using the text category tag as an output desired from the text classification model, to obtain a target text classification model, the target text classification model including a plurality of sub-text classification models, and parameters included in the sub-text classification models being different.

The determined input training text vector corresponding to each channel is used as the input of the text classification model, and the text classification model is trained by using the text category tag as the output desired from the text classification model, to obtain the target text classification model. The text classification model may be trained by using a CNN model. The target text classification model includes a plurality of sub-text classification models, and parameters included in the sub-text classification models are different, that is, the sub-text classification models are different models. Assuming that the input training text vectors of all the channels are the same, quantities and sizes of preset convolution kernels may be set to be different. In this way, the sub-text classification models obtained through training are different. If the input training text vectors of all the channels are different, even if quantities and sizes of preset convolution kernels in the channels are the same, the sub-text classification models obtained through training are different. A process of training the text classification model is a process of determining a weight and an offset parameter included in each convolution kernel in the model. To quickly train the text classification model, an adaptive moment estimation (Adam) optimization method may be used, which is an algorithm for optimizing a random target function based on a gradient. In addition, when there are excessive training samples, a training set may be divided into batches to perform optimization training on the model step by step. For example, a batch size is set to 70, that is, each batch includes 70 samples.

Figure 7:
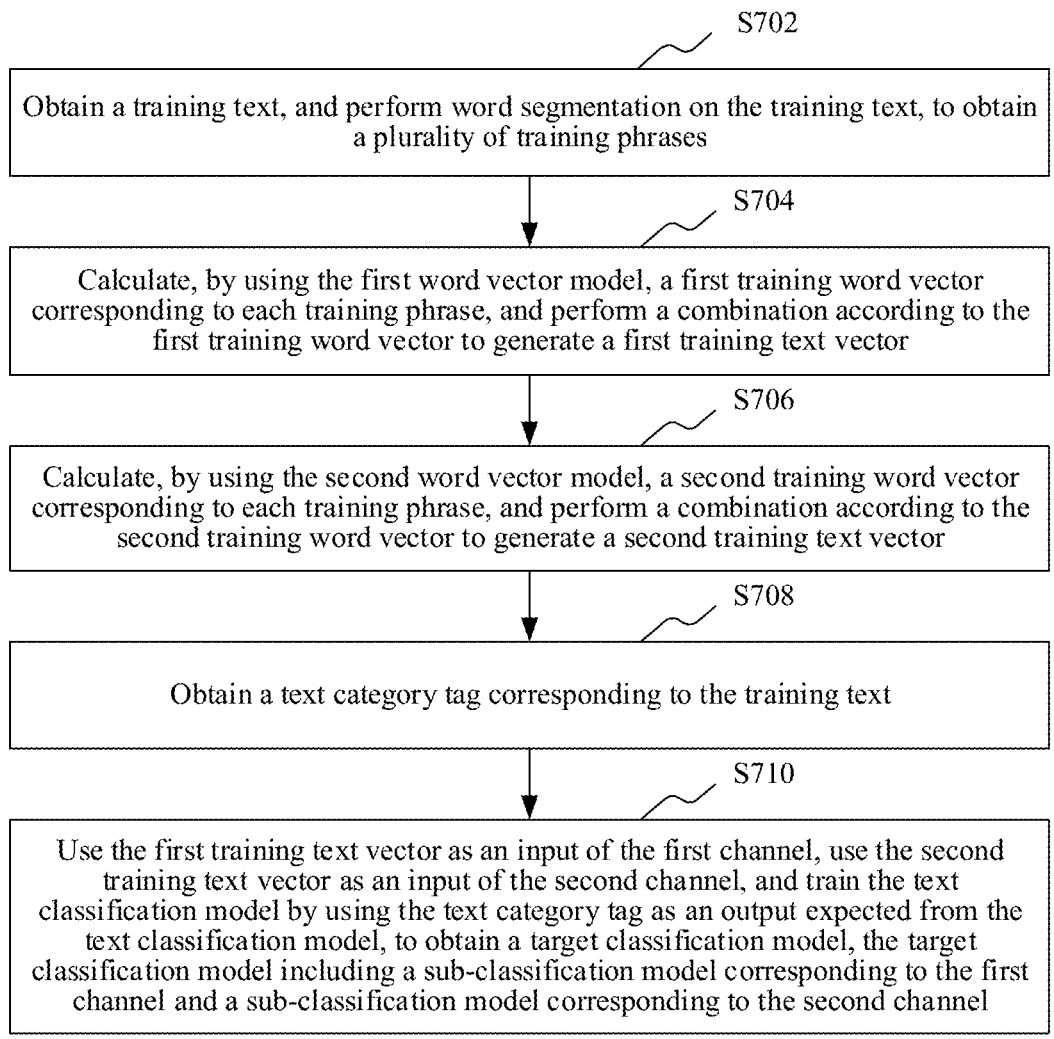
FIG. 7 is a flowchart of a method for training a text classification model according to another embodiment.

As shown in FIG. 7, in one embodiment, before the step of using the text vector as an input of each channel of the text classification model, and obtaining a sub-classification parameter outputted by each channel, the method further includes: training the text classification model, which specifically includes the following steps:

Step S702: Obtain a training text, and perform word segmentation on the training text, to obtain a plurality of training phrases.

A training text in a training text set is obtained, and then word segmentation is performed on the training text to obtain a plurality of training phrases. In one embodiment, after word segmentation is performed on the text, training phrases are further preprocessed. The preprocessing includes removing a stopword and the like. Finally, the plurality of training phrases are obtained.

Step S704: Calculate, by using the first word vector model, a first training word vector corresponding to each training phrase, and perform a combination according to the first training word vector to generate a first training text vector.

The to-be-trained text classification model includes two channels: a first channel and a second channel. The first channel corresponds to a first sub-text classification model, and the second channel corresponds to a second sub-text classification model. There are a plurality of models for calculating a word vector. The first training word vector corresponding to each training phrase is obtained through calculation by using the first word vector model, and then a combination is performed according to the first training word vector to generate the first training text vector. The first training text vector is a combination of a plurality of first training word vectors.

Step S706: Calculate, by using the second word vector model, a second training word vector corresponding to each training phrase, and perform a combination according to the second training word vector to generate a second training text vector.

The second word vector model is different from the first word vector model. The second training word vector corresponding to each training phrase is calculated by using the second word vector model, and then a combination is performed according to the second training word vector corresponding to each training word to generate the second training text vector.

Step S708: Obtain a text category tag corresponding to the training text.

Category tagging needs to be performed on the training text in advance. Generally, the training text is tagged manually, so that the text classification model is trained by using the tagged category as a category that is desired to be outputted.

Step S710: Use the first training text vector as an input of the first channel, use the second training text vector as an input of the second channel, and train the text classification model by using the text category tag as an output desired from the text classification model, to obtain a target classification model, the target classification model including a sub-classification model corresponding to the first channel and a sub-classification model corresponding to the second channel.

The first training text vector is input into the first channel of the to-be-trained text classification model, the second training text vector is input into the second channel of the to-be-trained text classification model, and the text classification model is trained by using the text category tag as the output desired from the text classification model, to obtain the target text classification model. The text classification model may be trained by using a CNN model. The target text classification model includes two sub-text classification models, and parameters included in the two sub-text classification models are different, that is, the two sub-text classification models are different models. A process of training the text classification model is a process of determining a weight and an offset parameter included in each convolution kernel in the model. To quickly train the text classification model, an Adam optimization method may be used. Compared with a gradient descent method in which calculation overheads when a data set is large are very large as a gradient on the data set needs to be calculated in each iteration, the Adam algorithm has an advantage of a quick calculation speed. In one embodiment, a model training speed is greatly increased by using the Adam algorithm. For 300 positive training samples and 300 negative training samples, training may be completed in only two minutes on a server (a 16G internal memory CPU mode) by using the Adam algorithm.

By using the foregoing method for training the text classification model, the text classification model can be quickly trained, and accuracy of the text classification model can be improved. In one embodiment, when a "game level hero data set" is classified, an accuracy rate of prediction performed on 1200 corpus texts only with 100 training samples reaches 90%. The training samples include positive training samples and negative training samples. The positive training sample refers to providing positive knowledge for learning, that is, learning what corpus is proper. The negative training sample refers to providing negative knowledge for learning, that is, learning what corpus is improper. Tags of the positive training samples and the negative training samples are obtained by manually tagging obtained corpus texts. A corpus text that conforms to a game level classification intention is tagged as proper (that is, a positive sample), and a corpus text that does not conform to the intention is tagged as improper (that is, a negative sample).

Some data (data obtained after word segmentation is performed) of the positive training samples and the negative training samples used above is as follows:

Positive Training Samples:
bronze level up unit dispose good up get hero recommend to me
A B beginner play what score
A B jungle location platinum level up separation who
A B high level score hero all have who
A B diamond section recommend few strong score hero tank or output all
A B Miyamoto and C and D which more worth start now
A and B represent phrases obtained after game name segmentation, and A and B form a complete game name of a game. C and D each represent a name of a character in the game. The definitions are also applicable to the following description.

Negative Training Samples:
A B I want get my level fall to bronze how to
A B how can score to A platinum
A B from bronze to diamond each level of represent what meaning
A B platinum level how play
A B how many levels play qualifying most easy score
why I deliberately get A B level fall to bronze match of or platinum Each line of the foregoing positive training samples and negative training samples shows a plurality of training phrases obtained after word segmentation is performed on a training text. Subsequently, a first training text vector and a second training text vector corresponding to each training text are obtained through calculation according to the plurality of training phrases. The first training text vector is used as an input of the first channel, and the second training text vector is used as an input of the second channel. The text classification model is trained by using a tag (positive or negative) corresponding to the training text as an desired output, to obtain the text classification model used for classifying the "game level hero data set" about the game name AB.

A to-be-classified text is classified by using the trained text classification model used for classifying the "game level hero data set" about the game name AB. Specifically, a first text vector and a second text vector corresponding to the to-be-classified text are calculated; the first text vector is used as an input of the first channel, and the second text vector is used as an input of the second channel; and an outputted classification result corresponding to the to-be-classified text is obtained, that is, whether the to-be-classified text belongs to game level hero data about the game name AB is obtained.

Figure 8:
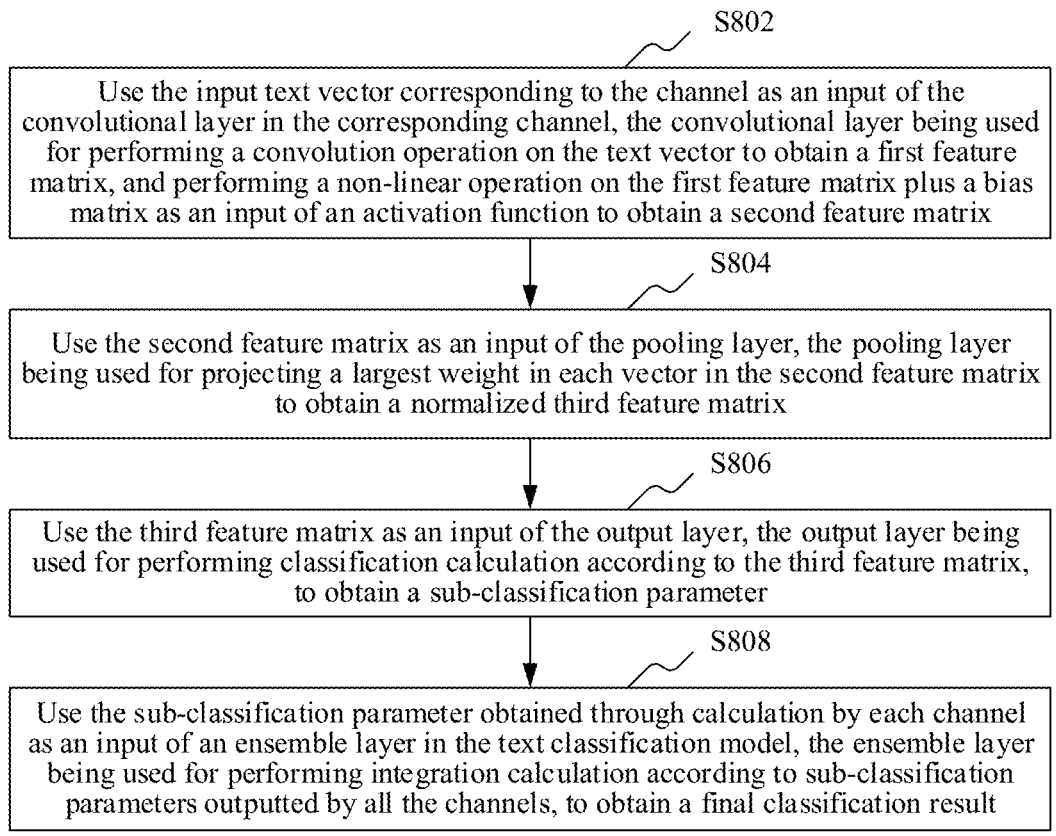
FIG. 8 is a flowchart of a method for determining a classification result according to an embodiment.

As shown in FIG. 8, in one embodiment, the text classification model is obtained through training by using a CNN model, and the sub-text classification model includes a convolutional layer, a pooling layer, and an output layer. The step of inputting the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model includes:

Step S802: Use the input text vector corresponding to the channel as an input of the convolutional layer in the corresponding channel, the convolutional layer being used for performing a convolution operation on the text vector to obtain a first feature matrix, and performing a non-linear operation on the first feature matrix plus a bias matrix as an input of an activation function to obtain a second feature matrix.

Figure 9:
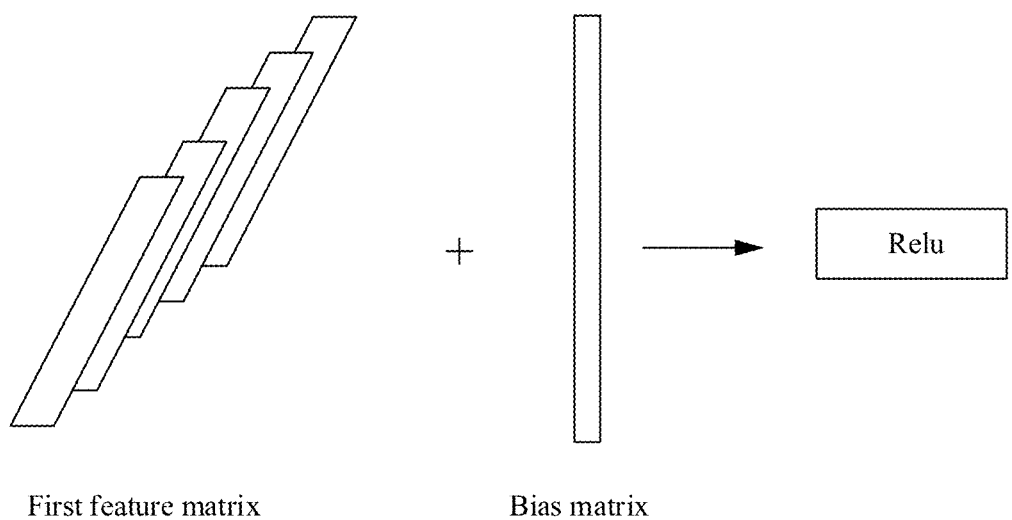
FIG. 9 is a schematic diagram of input to an activation function according to an embodiment.
Figure 10:
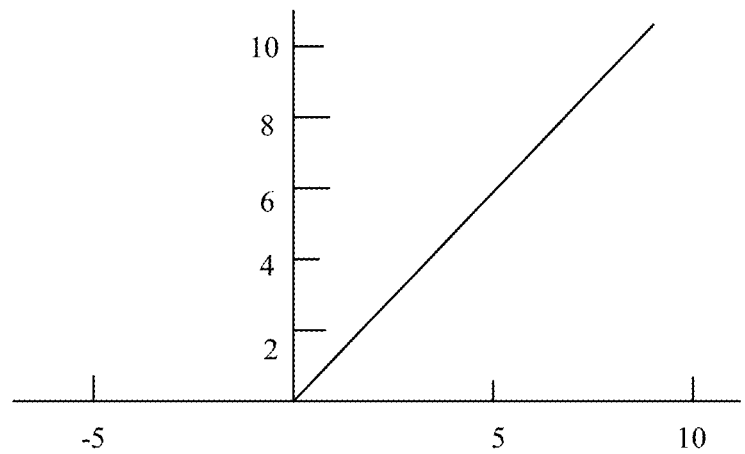
FIG. 10 is a schematic diagram of a Relu function according to an embodiment.

The text classification model is obtained through training by using the CNN model. Each channel included in the text classification model is obtained through training by using the CNN model. Each channel corresponds to a sub-text classification model. The sub-text classification model includes a convolutional layer, a pooling layer, and an output layer. First, the input text vector corresponding to each channel is used as an input of the convolutional layer, and the convolutional layer performs a convolution operation on the input text vector to obtain a first feature matrix. The convolution operation refers to performing a multiplication operation by using a convolution kernel. After convolution by using the convolution kernel, a feature dimension can be reduced, and a local feature related to a context in a text can be expressed. Different convolution windows have different expression capabilities. One convolution kernel corresponds to one output. For example, if there are 128 convolution kernels in the convolutional layer, 128 outputs will be obtained under the action of the 128 convolution kernels, that is, a 128-dimensional first feature matrix is obtained. As shown in FIG. 9, the first feature matrix plus a corresponding bias matrix is used as an input of an activation function. A Relu function may be used as the activation function, and the Relu function has a non-linear expression capability. A non-linear operation is performed on the first feature matrix by using the activation function to obtain a second feature matrix, and the second feature matrix is used as an input of the pooling layer. Compared with sigmoid and tan h functions that need to calculate an index when used as activation functions, the Relu function needs to perform determination only once, so that overheads are greatly reduced. A function expression is $f(x)=\max(0, x)$, as shown in FIG. 10.

Figure 11:
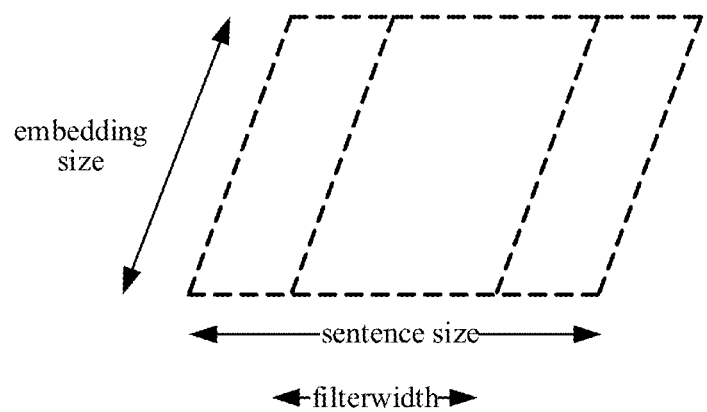
FIG. 11 is a schematic diagram of a feature matrix according to an embodiment.

In addition, the input text vector is actually a feature matrix, that is, includes a transversal vector and a longitudinal vector. As shown in FIG. 11, a dimension of the transversal vector is determined by a sentence size, that is, is determined by a quantity of phrases included in the sentence; and a dimension of the longitudinal vector is determined by an embedding size. A size of the convolution window is determined according to the embedding size and a filter width. The filter width is obtained through experimental adjustment. In one embodiment, several values such as 2, 3, 4, and 5 are selected as filter widths. Assuming that the word vector is 128-dimensional, 128*2, 128*3, 128*4, and 128*5 may be selected for the convolution window. After the operation performed by the convolutional layer, the size of the transversal vector is determined by the sentence size, feature vectors obtained from sentences of different sizes are different, and dimensions of convolution vectors generated by different convolution kernels are also different. Therefore, an operation of the pooling layer needs to be performed subsequently.

Step S804: Use the second feature matrix as an input of the pooling layer, the pooling layer being used for projecting a largest weight in each vector in the second feature matrix to obtain a normalized third feature matrix.

Figure 12:
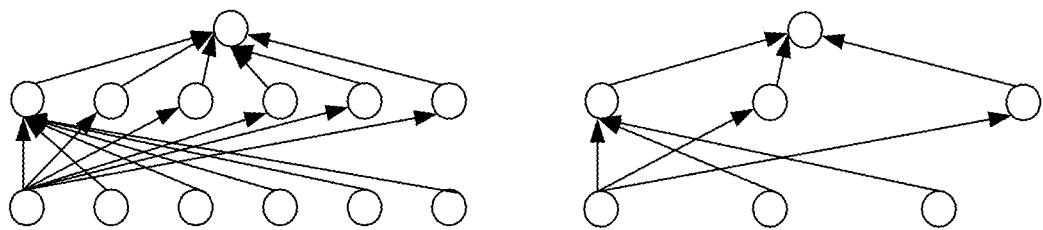
FIG. 12 is a schematic diagram of removing some neurons according to an embodiment.

The second feature matrix outputted by the convolutional layer is used as the input of the pooling layer. In one embodiment, the pooling layer uses max-pooling, that is, an element having strongest energy (that is, an element having a largest weight) in each vector obtained by the convolutional layer is projected to an input of the next layer, to ensure output normalization of different text lengths and different convolution kernels and ensure that major information is not lost. The second feature matrix is formed by a plurality of vectors, and the largest weight in each vector is projected to obtain a normalized third feature matrix. In another embodiment, the vector dimension may be adjusted after vectors of all the channels obtained by performing convolution according to different sizes are combined, to correspond to a classification output below. If an output is a binary classification issue, the vector dimension is adjusted to two dimensions. In addition, because excessive pooling layers easily lead to over-fitting, some neurons may be selected to be removed at a probability. FIG. 12 is a schematic diagram of removing some neurons at a probability of p1 (0.5) according to an embodiment. The left part is a schematic diagram before the neurons are removed, and the right part is a schematic diagram after the neurons are removed.

Step S806: Use the third feature matrix as an input of the output layer, the output layer being used for performing classification calculation according to the third feature matrix, to obtain a sub-classification parameter.

The output layer refers to a soft-max layer used for resolving a multi-classification issue, which is equivalent to a classifier and used for performing classification calculation according to the third feature matrix, to obtain a sub-classification parameter. The sub-classification parameter is used for measuring a classification result of the channel.

Step S808: Use the sub-classification parameter obtained through calculation by each channel as an input of an ensemble layer in the text classification model, the ensemble layer being used for performing integration calculation according to sub-classification parameters outputted by all the channels, to obtain a final classification result.

The text classification model further includes an ensemble layer. The ensemble layer is used for receiving the sub-classification parameter outputted by each channel, and then performing integration calculation according to the sub-classification parameter to obtain the final classification result.

Specifically, each channel has its own prediction result, and results are integrated. If the prediction results corresponding to the plurality of channels are the same, the result is used as the final result. If the prediction results corresponding to the plurality of channels are different, a classification result having a largest probability may be used as the final result. Alternatively, a total probability corresponding to each category may be calculated in a weighted summation manner, and a category having a largest total probability is used as a final output result.

In one embodiment, the step of using the sub-classification parameter obtained through calculation by each channel as an input of an ensemble layer in the text classification model, the ensemble layer being used for performing integration calculation according to sub-classification parameters outputted by all the channels, to obtain a final classification result includes: determining, according to the sub-classification parameter obtained through calculation by each channel, a sub-classification result corresponding to the channel, the sub-classification parameter including an output probability corresponding to each category; and using, if the plurality of channels have the same sub-classification result, the sub-classification result as the final classification result; or using a sub-classification result having a largest output probability as the final classification result if the plurality of channels have different sub-classification results.

The sub-classification parameter includes the output probability corresponding to each category, and a category having a largest output probability is used as a sub-classification result. After the sub-classification results corresponding to the plurality of channels are obtained, if the plurality of channels have the same sub-classification result, the sub-classification result is used as the final classification result. A sub-classification result having a largest output probability is used as the final classification result if the plurality of channels have different sub-classification results. For example, assuming that there are two channels, and a binary classification issue is involved. If an A channel outputs a category 1 having a probability of 0.6 and a category 2 having a probability of 0.4, while a B channel outputs a category 1 having a probability of 0.8 and a category 2 having a probability of 0.2, because classification results of the two channels are the same, the category 1 is a final classification result. If an A channel outputs a category 1 having a probability of 0.6 and a category 2 having a probability of 0.4, while a B channel outputs a category 1 having a probability of 0.2 and a category 2 having a probability of 0.8, because classification results of the two channels are different, the category having a largest probability is selected as a final classification result.

In another embodiment, for more than two channels, the final result may be obtained through integration based on a principle that "the minority is subordinate to the majority", and if quantities are the same, a category having a largest probability is used as a final classification result. For example, there are three channels, and if two channels output the same result, the result corresponding to the two channels is used as a final classification result.

Figure 13:
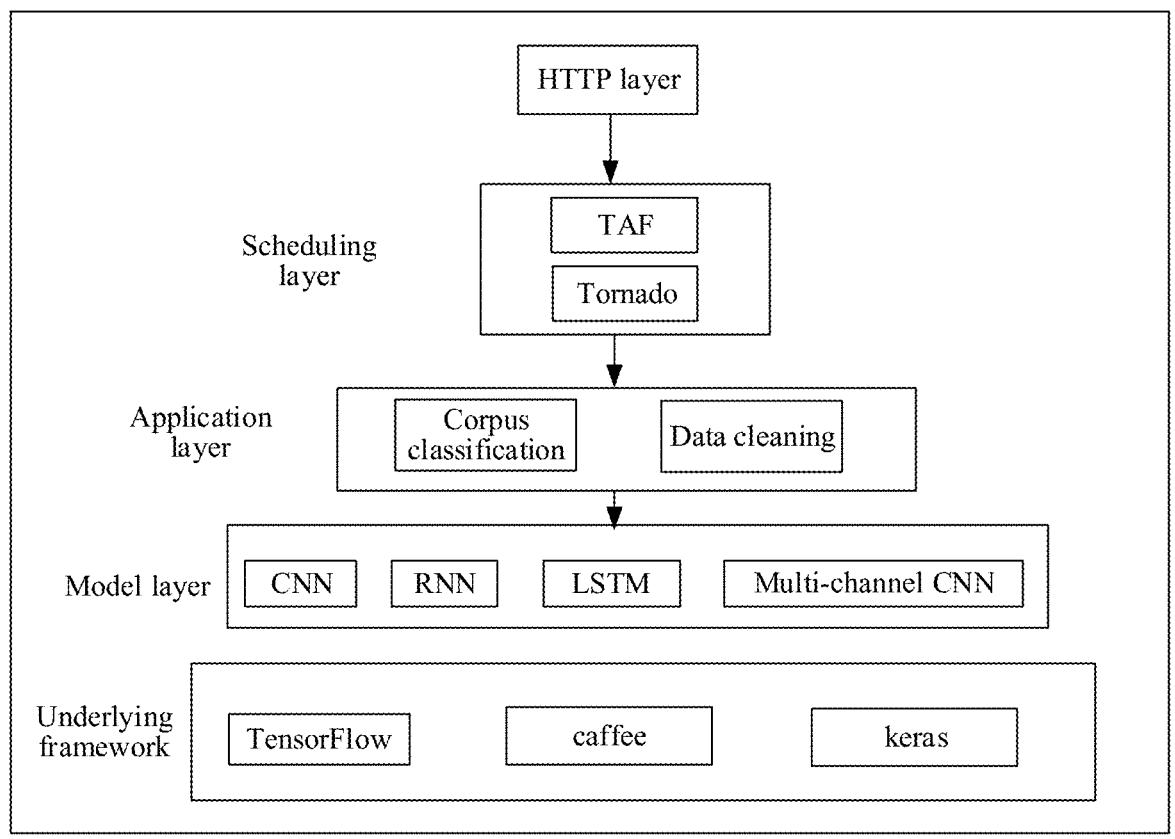
FIG. 13 is an architectural diagram of a service capacity according to an embodiment.

As shown in FIG. 13, in one embodiment, to enable a text classification model obtained through training to be quickly applied to a service, an architectural diagram of a service capacity of the text classification model is provided. An architecture of the service capacity includes: an underlying framework, a model layer, an application layer, a scheduling layer, and an HTTP layer. The HTTP layer mainly provides an interface externally for a service user to invoke. TAF in the scheduling layer is a general C++ scheduling framework facilitating access for C++ engineering, and tornado is a Python scheduling framework facilitating access for Python engineering. The application layer provides a corpus classification function and a data cleaning function. The model layer provides some machine learning models, including a CNN model, an RNN model, a long/short-term memory neuron (LSTM) model, a multi-channel CNN model, and the like. The multi-channel CNN model is used if the text classification model is invoked. A TensorFlow framework, a caffee framework, and a keras framework may be used as the underlying framework to implement the model. The TensorFlow framework is a second-generation artificial intelligence learning system developed by Google, and the caffee framework and the keras framework are both deep learning frameworks.

Figure 14:
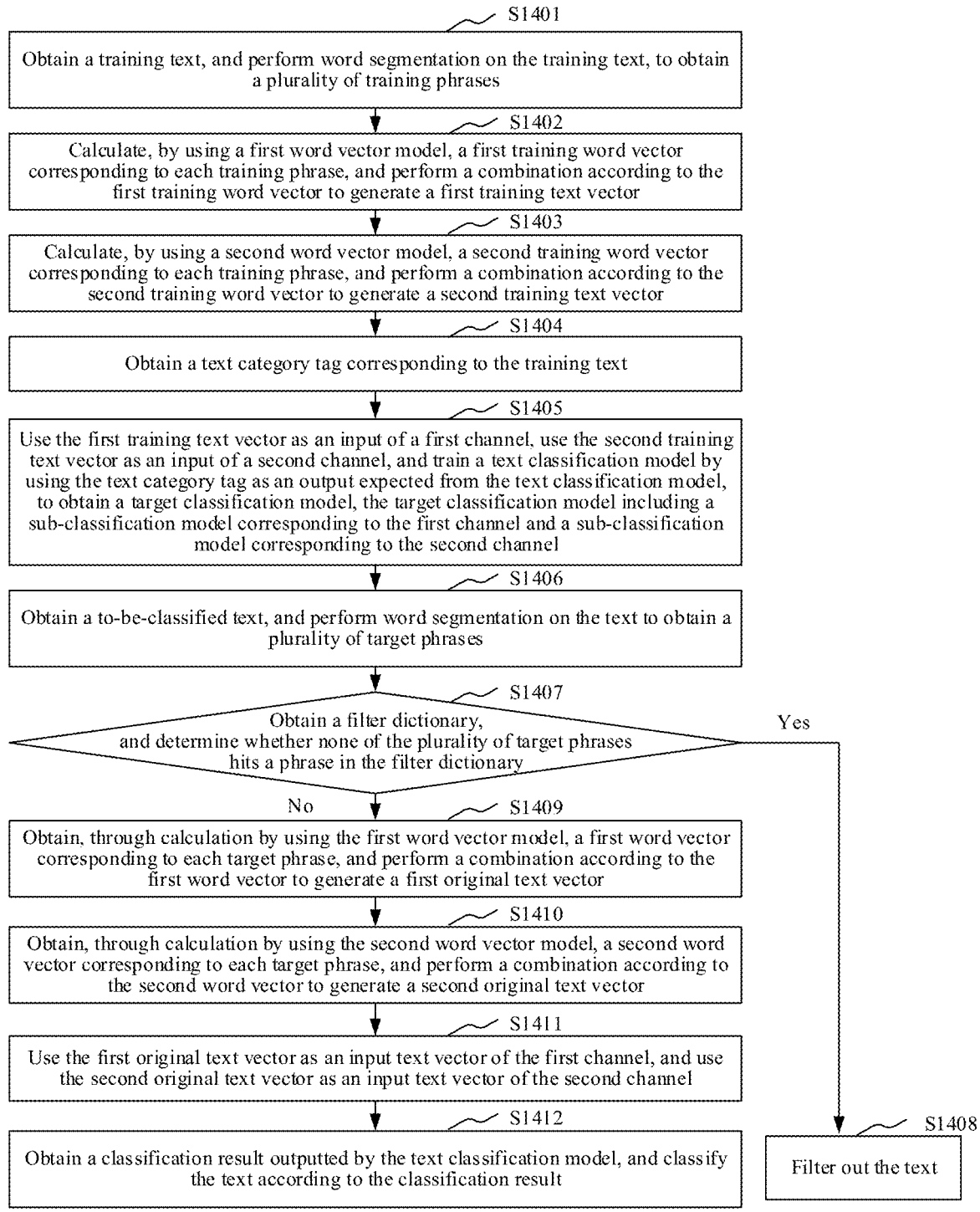
FIG. 14 is a flowchart of a text classification method according to another embodiment.

As shown in FIG. 14, in one embodiment, a text classification method is provided, specifically including the following steps:

Step S1401: Obtain a training text, and perform word segmentation on the training text, to obtain a plurality of training phrases.

Step S1402: Calculate, by using a first word vector model, a first training word vector corresponding to each training phrase, and perform a combination according to the first training word vector to generate a first training text vector.

Step S1403: Calculate, by using a second word vector model, a second training word vector corresponding to each training phrase, and perform a combination according to the second training word vector to generate a second training text vector.

Step S1404: Obtain a text category tag corresponding to the training text.

Step S1405: Use the first training text vector as an input of a first channel, use the second training text vector as an input of a second channel, and train a text classification model by using the text category tag as an output desired from the text classification model, to obtain a target classification model, the target classification model including a sub-classification model corresponding to the first channel and a sub-classification model corresponding to the second channel.

Step S1406: Obtain a to-be-classified text, and perform word segmentation on the text to obtain a plurality of target phrases.

Step S1407: Obtain a filter dictionary, and determine whether none of the plurality of target phrases is a phrase in the filter dictionary; and if yes, perform step S1408; or if no, perform step S1409.

Step S1408: Filter out the text.

Step S1409: Obtain, through calculation by using the first word vector model, a first word vector corresponding to each target phrase, and perform a combination according to the first word vector to generate a first original text vector.

Step S1410: Obtain, through calculation by using the second word vector model, a second word vector corresponding to each target phrase, and perform a combination according to the second word vector to generate a second original text vector.

Step S1411: Use the first original text vector as an input text vector of the first channel, and use the second original text vector as an input text vector of the second channel.

Step S1412: Obtain a classification result outputted by the text classification model, and classify the text according to the classification result.

In the foregoing text classification method, the text is classified by using a two-channel text classification model, which achieves a better effect than manual processing and a conventional machine learning method, and overcomes a defect of an excessively high requirement on the quantity and quality of samples in a deep learning method. The model has a lightweight feature, which has a fast training speed, and is applicable to a corpus classification scenario with much noise.

The text classification method in the foregoing embodiments may be applied to any scenario in which text classification is performed according to a textual intention (that is, a classification purpose). For example, the method may be applied to a scenario of game text classification, a scenario of social application text classification, and a scenario of topic text classification. In different application scenarios, to-be-classified texts come from different applications. For example, in the scenario of game text classification, a to-be-classified text comes from game data; in the scenario of social application text classification, a to-be-classified text comes from user data during a use process of a social application; and in the scenario of topic text classification, a to-be-classified text comes from a forum, a portal site, or the like. In different application scenarios, the text classification method can achieve a desirable classification result.

In a game text classification scenario, according to sects in a game, obtained texts related to the sects are respectively classified into categories corresponding to the sects. For example, the sects include Emei sect, Wudang sect, and Shaolin sect. After a large quantity of game corpus texts are grabbed from the Internet, some of the grabbed corpus texts are manually tagged (for example, 10000 corpora are grabbed in total, and 300 of them are extracted for manual tagging). Texts related to the Emei sect, texts related to the Wudang sect, and texts related to the Shaolin sect are separately tagged, and texts beyond the three categories are tagged as others. Then, a text classification model is trained by using the tagged texts as training samples, to obtain a text classification model used for performing sect classification on the game texts. Then, the remaining unclassified corpus texts are classified into the sect categories by using the trained text classification model. By applying the foregoing text classification method to the game text classification scenario, an accuracy rate of prediction performed on 5000 game corpus texts only with the 300 training samples is higher than 95%.

In a topic text classification scenario, different people focus on different topics. For example, some people focus on topics on sports, some people focus on topics on movies, some people focus on topics on electronic technologies, and some people focus on topics on cosmetology. According to different topics that people focus on, text content is classified into sports, movies, electronic technologies, cosmetology, and other categories. After a large quantity of topic texts are grabbed from the Internet, some of the grabbed corpus texts are manually tagged, which are respectively tagged as texts related to sports, texts related to movies, texts related to electronic technologies, texts related to cosmetology, and other texts. Then, a text classification model is trained by using the tagged texts as training samples, to obtain a text classification model for topic classification, and the remaining unclassified corpus texts are classified into the topic categories by using the trained text classification model. By applying the foregoing text classification method to the topic text classification scenario, an accuracy rate of category prediction performed on 2000 topic texts only with 200 training samples is higher than 97%.

Figure 15:
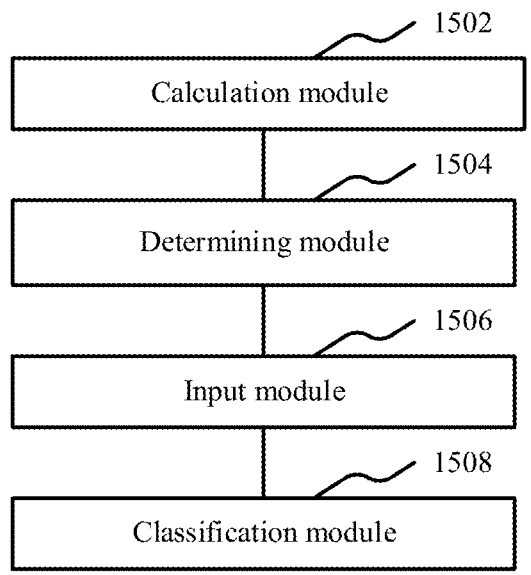
FIG. 15 is a structural block diagram of a text classification apparatus according to an embodiment.

As shown in FIG. 15, in one embodiment, a text classification apparatus is provided, including: a calculation module 1502, configured to obtain a to-be-classified text, and calculate an original text vector corresponding to the text; a determining module 1504, configured to determine, according to the original text vector, an input text vector corresponding to each channel of a trained text classification model; an input module 1506, configured to input the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model; and a classification module 1508, configured to obtain a classification result outputted by the text classification model, and classify the text according to the classification result.

In one embodiment, the calculation module is further configured to perform word segmentation on the text to obtain a plurality of target phrases, calculate a word vector corresponding to each target phrase, and determine the original text vector corresponding to the text according to the word vector corresponding to each target phrase.

Figure 16:
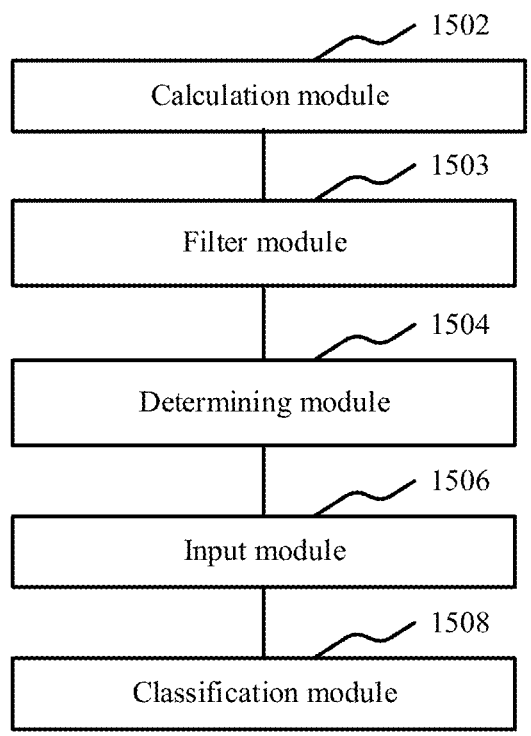
FIG. 16 is a structural block diagram of a text classification apparatus according to another embodiment.

As shown in FIG. 16, in one embodiment, the text classification apparatus further includes: a filter module 1503, configured to obtain a filter dictionary, and filter out the text if none of the plurality of target phrases is a phrase in the filter dictionary, where the operation of calculating a word vector corresponding to each target phrase is performed if at least one of the plurality of target phrases is a phrase in the filter dictionary.

Figure 17:
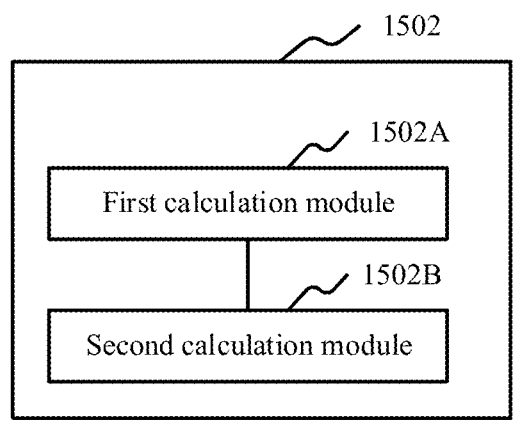
FIG. 17 is a structural block diagram of a calculation module according to an embodiment.

As shown in FIG. 17, in one embodiment, the text classification model includes a first channel and a second channel; and the calculation module 1502 includes: a first calculation module 1502A, configured to obtain, through calculation by using a first word vector model, a first word vector corresponding to each target phrase, and perform a combination according to the first word vector to generate a first original text vector; and a second calculation module 1502B, configured to obtain, through calculation by using a second word vector model, a second word vector corresponding to each target phrase, and perform a combination according to the second word vector to generate a second original text vector; and the determining module 1504 is further configured to use the first original text vector as an input text vector of the first channel, and use the second original text vector as an input text vector of the second channel.

In one embodiment, the first calculation module is further configured to construct a dictionary including the plurality of target phrases, and determine, according to a quantity of times that each target phrase appears in the text, the first word vector of the target phrase; and determine, according to a location of each target phrase in the dictionary and the first word vector of each target phrase, the first original text vector corresponding to the text. The second calculation module is further configured to obtain a word vector library corresponding to the second word vector model, and obtain, from the word vector library, the second word vector corresponding to each target phrase; and construct, according to the second word vector corresponding to each target phrase, the second original text vector corresponding to the text.

Figure 18:
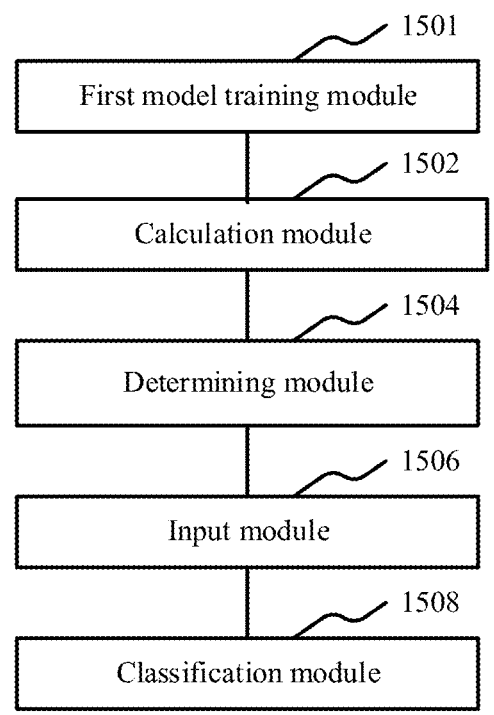
FIG. 18 is a structural block diagram of a text classification apparatus according to still another embodiment.

As shown in FIG. 18, in one embodiment, the text classification apparatus further includes: a first model training module 1501, configured to obtain a training text, and calculate an original training text vector corresponding to the training text; determine, according to the original training text vector, an input training text vector corresponding to each channel of the text classification model; obtain a text category tag corresponding to the training text; and input the input training text vector corresponding to each channel into the corresponding channel of the text classification model, and train the text classification model by using the text category tag as an output desired from the text classification model, to obtain a target text classification model, the target text classification model including a plurality of sub-text classification models, and parameters included in the sub-text classification models being different.

Figure 19:
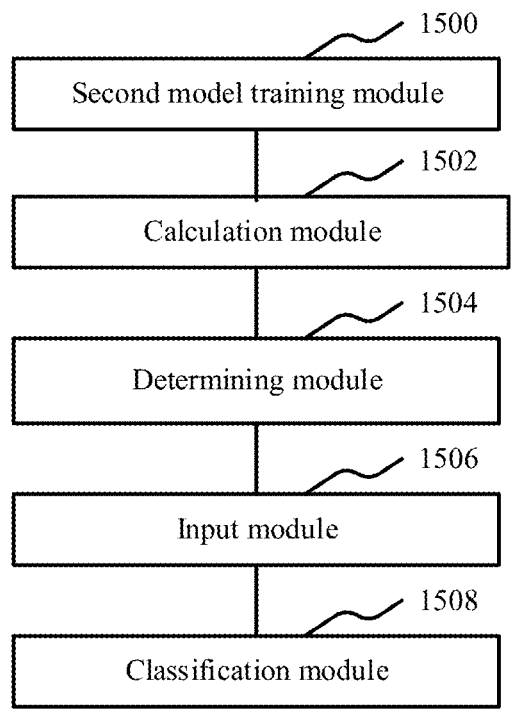
FIG. 19 is a structural block diagram of a text classification apparatus according to yet another embodiment.

As shown in FIG. 19, in one embodiment, the text classification apparatus further includes: a second model training module 1500, configured to obtain a training text, and perform word segmentation on the training text, to obtain a plurality of training phrases; calculate, by using the first word vector model, a first training word vector corresponding to each training phrase, and perform a combination according to the first training word vector to generate a first training text vector; calculate, by using the second word vector model, a second training word vector corresponding to each training phrase, and perform a combination according to the second training word vector to generate a second training text vector; obtain a text category tag corresponding to the training text; and use the first training text vector as an input of the first channel, use the second training text vector as an input of the second channel, and train the text classification model by using the text category tag as an output desired from the text classification model, to obtain a target classification model, the target classification model including a sub-classification model corresponding to the first channel and a sub-classification model corresponding to the second channel.

Figure 20:
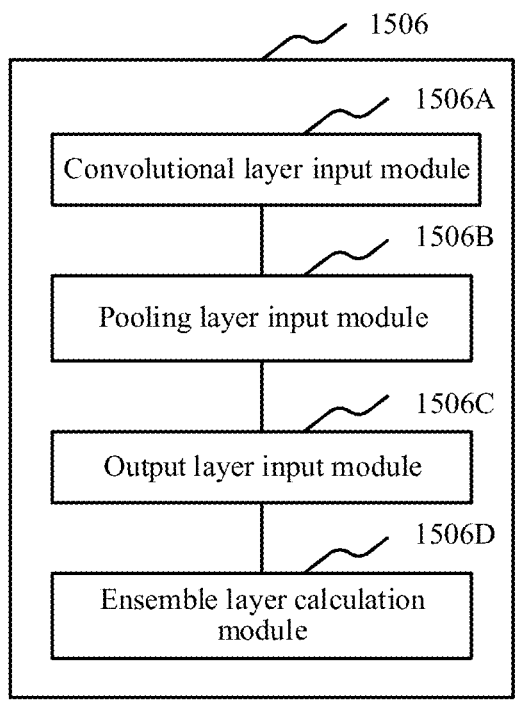
FIG. 20 is a structural block diagram of an input module according to an embodiment.

As shown in FIG. 20, in one embodiment, the text classification model is obtained through training by using a CNN model, and the sub-text classification model includes a convolutional layer, a pooling layer, and an output layer; and the input module 1506 includes: a convolutional layer input module 1506A, configured to use the input text vector corresponding to the channel as an input of the convolutional layer in the corresponding channel, the convolutional layer being used for performing a convolution operation on the text vector to obtain a first feature matrix, and performing a non-linear operation on the first feature matrix plus a bias matrix as an input of an activation function to obtain a second feature matrix; a pooling layer input module 1506B, configured to use the second feature matrix as an input of the pooling layer, the pooling layer being used for projecting a largest weight in each vector in the second feature matrix to obtain a normalized third feature matrix; an output layer input module 1506C, configured to use the third feature matrix as an input of the output layer, the output layer being used for performing classification calculation according to the third feature matrix, to obtain a sub-classification parameter; and an ensemble layer calculation module 1506D, configured to use the sub-classification parameter obtained through calculation by each channel as an input of an ensemble layer in the text classification model, the ensemble layer being used for performing integration calculation according to sub-classification parameters outputted by all the channels, to obtain a final classification result.

In one embodiment, the ensemble layer calculation module is further configured to determine, according to the sub-classification parameter obtained through calculation by each channel, a sub-classification result corresponding to the channel, the sub-classification parameter including an output probability corresponding to each category; and use, if the plurality of channels have the same sub-classification result, the sub-classification result as the final classification result; or use a sub-classification result having a largest output probability as the final classification result if the plurality of channels have different sub-classification results.

Figure 21:
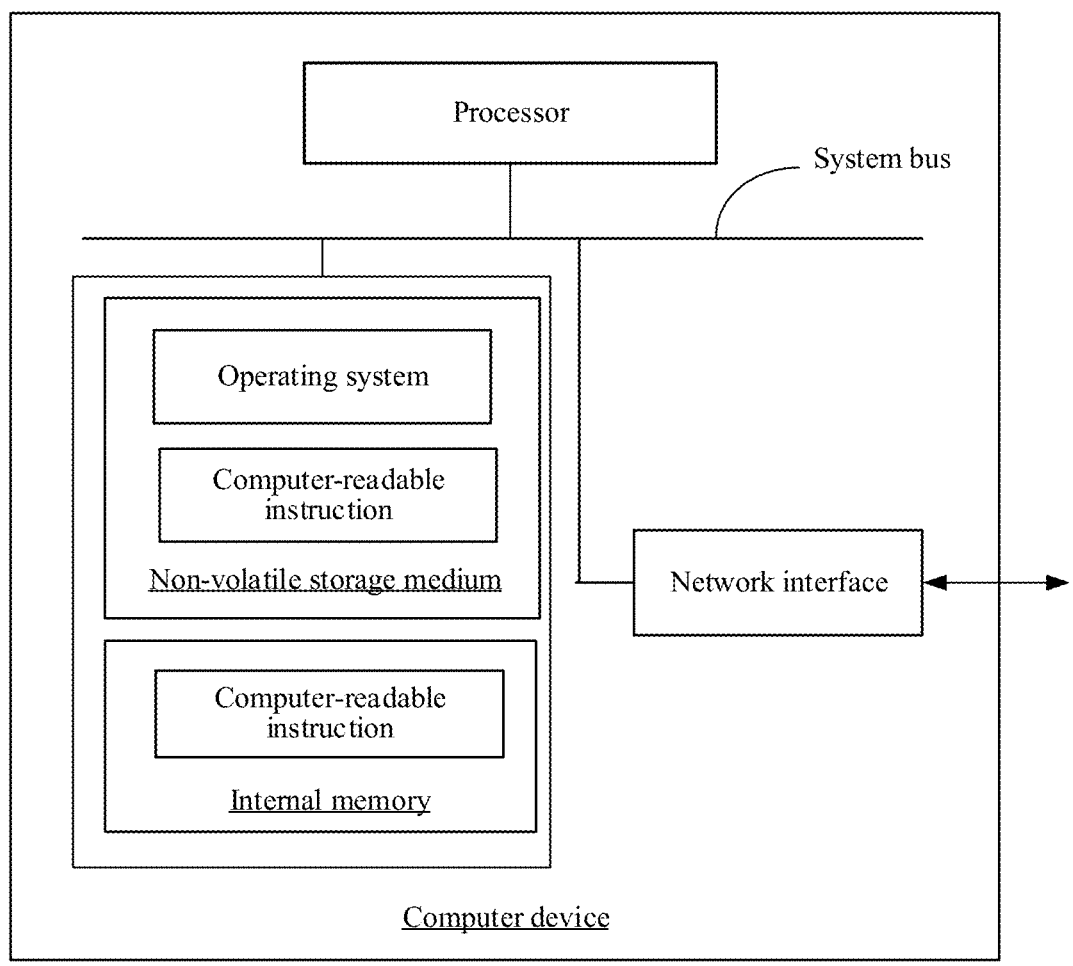
FIG. 21 is a diagram of an internal structure of a computer device according to an embodiment.

FIG. 21 is a diagram of an internal structure of a computer device according to an embodiment. The computer device may be specifically a server or a terminal. As shown in FIG. 21, the computer device includes a processor, a memory, and a network interface that are connected by using a system bus. The memory includes a non-volatile storage medium and an internal memory. The non-volatile storage medium of the computer device stores an operating system, and may further store a computer-readable instruction. The computer-readable instruction, when executed by the processor, may cause the processor to implement the text classification method. The internal memory may also store a computer-readable instruction, and the computer-readable instruction, when executed by the processor, may cause the processor to perform the text classification method. A person skilled in the art may understand that, the structure shown in FIG. 21 is merely a block diagram of a partial structure related to the solution of this application, and does not limit the computer device to which the solution of this application is applied. Specifically, the computer device may include more or fewer components than those in the figure, or some components may be combined, or a different component deployment may be used.

In one embodiment, the text classification method provided in this application may be implemented in a form of a computer-readable instruction, and the computer-readable instruction may be run on the computer device shown in FIG. 21. The memory of the computer device may store program modules forming the text classification apparatus, for example, the calculation module 1502, the determining module 1504, the input module 1506, and the classification module 1508 shown in FIG. 15. The computer-readable instruction formed by the program modules causes the processor to perform the steps of the text classification method in the embodiments of this application described in this specification. For example, the computer device shown in FIG. 21 may obtain a to-be-classified text, and calculate an original text vector corresponding to the text by using the calculation module 1502 of the text classification apparatus shown in FIG. 15; determine, according to the original text vector, an input text vector corresponding to each channel of a trained text classification model by using the determining module 1504; input the input text vector corresponding to each channel into the corresponding channel of the text classification model by using the input module 1506, the text classification model including a plurality of channels, each channel being corresponding to a sub-text classification model, and the text classification model being used for determining a classification result according to a sub-classification parameter outputted by each sub-text classification model; and obtain a classification result outputted by the text classification model, and classify the text according to the classification result by using the classification module 1508.

In one embodiment, a computer device is provided, including a memory and a processor, the memory storing a computer-readable instruction, the computer-readable instruction, when executed by the processor, causing the processor to perform the following operations: obtaining a to-be-classified text, and calculating an original text vector corresponding to the text; determining, according to the original text vector, an input text vector corresponding to each channel of a trained text classification model; inputting the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model; and obtaining a classification result outputted by the text classification model, and classifying the text according to the classification result.

In one embodiment, the operation of calculating an original text vector corresponding to the text includes: performing word segmentation on the text to obtain a plurality of target phrases; and calculating a word vector corresponding to each target phrase, and determining the original text vector corresponding to the text according to the word vector corresponding to each target phrase.

In one embodiment, after performing the operation of performing word segmentation on the text to obtain a plurality of target phrases, the processor is further configured to perform the following operation: obtaining a filter dictionary, and filtering out the text if none of the plurality of target phrases is a phrase in the filter dictionary; or performing the operation of calculating a word vector corresponding to each target phrase if at least one of the plurality of target phrases is a phrase in the filter dictionary.

In one embodiment, the text classification model includes a first channel and a second channel; the operation of calculating a word vector corresponding to each target phrase, and determining the original text vector corresponding to the text according to the word vector corresponding to each target phrase includes: obtaining through calculation by using a first word vector model, a first word vector corresponding to each target phrase, and incorporating the first word vector to generate a first original text vector; and obtaining through calculation by using a second word vector model, a second word vector corresponding to each target phrase, and incorporating the second word vector to generate a second original text vector; and the operation of determining, according to the original text vector, an input text vector corresponding to each channel of a trained text classification model includes: using the first original text vector as an input text vector of the first channel, and using the second original text vector as an input text vector of the second channel.

In one embodiment, the operation of obtaining through calculation by using a first word vector model, a first word vector corresponding to each target phrase, and incorporating the first word vector to generate a first original text vector includes: constructing a dictionary including the plurality of target phrases, and determining, according to a quantity of times that each target phrase appears in the text, the first word vector of the target phrase; and determining, according to a location of each target phrase in the dictionary and the first word vector of each target phrase, the first original text vector corresponding to the text; and the operation of obtaining through calculation by using a second word vector model, a second word vector corresponding to each target phrase, and incorporating the second word vector to generate a second original text vector includes: obtaining a word vector library corresponding to the second word vector model, and obtaining, from the word vector library, the second word vector corresponding to each target phrase; and constructing, according to the second word vector corresponding to each target phrase, the second original text vector corresponding to the text.

In one embodiment, before the operation of using the text vector as an input of each channel of the text classification model, and obtaining a sub-classification parameter outputted by each channel, the processor is further configured to perform the following operations: obtaining a training text, and calculating an original training text vector corresponding to the training text; determining, according to the original training text vector, an input training text vector corresponding to each channel of the text classification model; obtaining a text category tag corresponding to the training text; and inputting the input training text vector corresponding to each channel into the corresponding channel of the text classification model, and training the text classification model by using the text category tag as an output desired from the text classification model, to obtain a target text classification model, the target text classification model including a plurality of sub-text classification models, and parameters included in the sub-text classification models being different.

In one embodiment, before the operation of using the text vector as an input of each channel of the text classification model, and obtaining a sub-classification parameter outputted by each channel, the processor is further configured to perform the following operations: obtaining a training text, and performing word segmentation on the training text, to obtain a plurality of training phrases; calculating, by using the first word vector model, a first training word vector corresponding to each training phrase, and incorporating the first training word vector to generate a first training text vector; calculating, by using the second word vector model, a second training word vector corresponding to each training phrase, and incorporating the second training word vector to generate a second training text vector; obtaining a text category tag corresponding to the training text; and using the first training text vector as an input of the first channel, using the second training text vector as an input of the second channel, and training the text classification model by using the text category tag as an output desired from the text classification model, to obtain a target classification model, the target classification model including a sub-classification model corresponding to the first channel and a sub-classification model corresponding to the second channel.

In one embodiment, the text classification model is obtained through training by using a CNN model, and the sub-text classification model includes a convolutional layer, a pooling layer, and an output layer; and the operation of inputting the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model includes: using the input text vector corresponding to the channel as an input of the convolutional layer in the corresponding channel, the convolutional layer being used for performing a convolution operation on the text vector to obtain a first feature matrix, and performing a non-linear operation on the first feature matrix plus a bias matrix as an input of an activation function to obtain a second feature matrix; using the second feature matrix as an input of the pooling layer, the pooling layer being used for projecting a largest weight in each vector in the second feature matrix to obtain a normalized third feature matrix; using the third feature matrix as an input of the output layer, the output layer being used for performing classification calculation according to the third feature matrix, to obtain a sub-classification parameter; and using the sub-classification parameter obtained through calculation by each channel as an input of an ensemble layer in the text classification model, the ensemble layer being used for performing integration calculation according to sub-classification parameters outputted by all the channels, to obtain a final classification result.

In one embodiment, the operation of using the sub-classification parameter obtained through calculation by each channel as an input of an ensemble layer in the text classification model, the ensemble layer being used for performing integration calculation according to sub-classification parameters outputted by all the channels, to obtain a final classification result includes: determining, according to the sub-classification parameter obtained through calculation by each channel, a sub-classification result corresponding to the channel, the sub-classification parameter including an output probability corresponding to each category; and using, if the plurality of channels have the same sub-classification result, the sub-classification result as the final classification result; or using a sub-classification result having a largest output probability as the final classification result if the plurality of channels have different sub-classification results.

In one embodiment, a computer-readable storage medium is provided, storing a computer-readable instruction, the computer-readable instruction, when executed by a processor, causing the processor to perform the following operations: obtaining a to-be-classified text, and calculating an original text vector corresponding to the text; determining, according to the original text vector, an input text vector corresponding to each channel of a trained text classification model; inputting the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model; and obtaining a classification result outputted by the text classification model, and classifying the text according to the classification result.

In one embodiment, the operation of calculating an original text vector corresponding to the text includes: performing word segmentation on the text to obtain a plurality of target phrases; and calculating a word vector corresponding to each target phrase, and determining the original text vector corresponding to the text according to the word vector corresponding to each target phrase.

In one embodiment, after performing the operation of performing word segmentation on the text to obtain a plurality of target phrases, the processor is further configured to perform the following operation: obtaining a filter dictionary, and filtering out the text if none of the plurality of target phrases is a phrase in the filter dictionary; or performing the operation of calculating a word vector corresponding to each target phrase if at least one of the plurality of target phrases is a phrase in the filter dictionary.

In one embodiment, the text classification model includes a first channel and a second channel; the operation of calculating a word vector corresponding to each target phrase, and determining the original text vector corresponding to the text according to the word vector corresponding to each target phrase includes: obtaining through calculation by using a first word vector model, a first word vector corresponding to each target phrase, and incorporating the first word vector to generate a first original text vector; and obtaining through calculation by using a second word vector model, a second word vector corresponding to each target phrase, and incorporating the second word vector to generate a second original text vector; and the operation of determining, according to the original text vector, an input text vector corresponding to each channel of a trained text classification model includes: using the first original text vector as an input text vector of the first channel, and using the second original text vector as an input text vector of the second channel.

In one embodiment, the operation of obtaining through calculation by using a first word vector model, a first word vector corresponding to each target phrase, and incorporating the first word vector to generate a first original text vector includes: constructing a dictionary including the plurality of target phrases, and determining, according to a quantity of times that each target phrase appears in the text, the first word vector of the target phrase; and determining, according to a location of each target phrase in the dictionary and the first word vector of each target phrase, the first original text vector corresponding to the text; and the operation of obtaining through calculation by using a second word vector model, a second word vector corresponding to each target phrase, and incorporating the second word vector to generate a second original text vector includes: obtaining a word vector library corresponding to the second word vector model, and obtaining, from the word vector library, the second word vector corresponding to each target phrase; and constructing, according to the second word vector corresponding to each target phrase, the second original text vector corresponding to the text.

In one embodiment, before the operation of using the text vector as an input of each channel of the text classification model, and obtaining a sub-classification parameter outputted by each channel, the processor is further configured to perform the following operations: obtaining a training text, and calculating an original training text vector corresponding to the training text; determining, according to the original training text vector, an input training text vector corresponding to each channel of the text classification model; obtaining a text category tag corresponding to the training text; and inputting the input training text vector corresponding to each channel into the corresponding channel of the text classification model, and training the text classification model by using the text category tag as an output desired from the text classification model, to obtain a target text classification model, the target text classification model including a plurality of sub-text classification models, and parameters included in the sub-text classification models being different.

In one embodiment, before the operation of using the text vector as an input of each channel of the text classification model, and obtaining a sub-classification parameter outputted by each channel, the processor is further configured to perform the following operations: obtaining a training text, and performing word segmentation on the training text, to obtain a plurality of training phrases; calculating, by using the first word vector model, a first training word vector corresponding to each training phrase, and incorporating the first training word vector to generate a first training text vector; calculating, by using the second word vector model, a second training word vector corresponding to each training phrase, and incorporating the second training word vector to generate a second training text vector; obtaining a text category tag corresponding to the training text; and using the first training text vector as an input of the first channel, using the second training text vector as an input of the second channel, and training the text classification model by using the text category tag as an output desired from the text classification model, to obtain a target classification model, the target classification model including a sub-classification model corresponding to the first channel and a sub-classification model corresponding to the second channel.

In one embodiment, the text classification model is obtained through training by using a CNN model, and the sub-text classification model includes a convolutional layer, a pooling layer, and an output layer; and the operation of inputting the input text vector corresponding to each channel into the corresponding channel of the text classification model, the text classification model including a plurality of channels, each channel being corresponding to a sub-text classification model, and the text classification model being used for determining a classification result according to a sub-classification parameter outputted by each sub-text classification model includes: using the input text vector corresponding to the channel as an input of the convolutional layer in the corresponding channel, the convolutional layer being used for performing a convolution operation on the text vector to obtain a first feature matrix, and performing a non-linear operation on the first feature matrix plus a bias matrix as an input of an activation function to obtain a second feature matrix; using the second feature matrix as an input of the pooling layer, the pooling layer being used for projecting a largest weight in each vector in the second feature matrix to obtain a normalized third feature matrix; using the third feature matrix as an input of the output layer, the output layer being used for performing classification calculation according to the third feature matrix, to obtain a sub-classification parameter; and using the sub-classification parameter obtained through calculation by each channel as an input of an ensemble layer in the text classification model, the ensemble layer being used for performing integration calculation according to sub-classification parameters outputted by all the channels, to obtain a final classification result.

In one embodiment, the operation of using the sub-classification parameter obtained through calculation by each channel as an input of an ensemble layer in the text classification model, the ensemble layer being used for performing integration calculation according to sub-classification parameters outputted by all the channels, to obtain a final classification result includes: determining, according to the sub-classification parameter obtained through calculation by each channel, a sub-classification result corresponding to the channel, the sub-classification parameter including an output probability corresponding to each category; and using, if the plurality of channels have the same sub-classification result, the sub-classification result as the final classification result; or using a sub-classification result having a largest output probability as the final classification result if the plurality of channels have different sub-classification results.

It is to be understood that steps in the embodiments of this application are not necessarily performed in a sequence indicated by the step numbers. Unless explicitly specified in this specification, the steps are performed without any strict sequence limit, and may be performed in other sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

A person of ordinary skill in the art may understand that all or some procedures of the method in the foregoing embodiments may be implemented by a computer-readable instruction instructing related hardware. The program may be stored in a non-volatile computer-readable storage medium, and when the program is executed, the procedures in the foregoing method embodiments may be implemented. Any reference to a memory, storage, database or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration rather than limitation, the RAM is available in a plurality of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features of the foregoing embodiments of the computer-readable instruction may be randomly combined. To make description concise, not all possible combinations of the technical features in the foregoing embodiments are described. However, the combinations of these technical features shall be considered as falling within the scope of this specification provided that no conflict exists.

What is claimed is:

1. A text classification method, comprising:
obtaining, by a computer device, target phrases of a text;
determining, by the computer device, a first input text vector and a second input text vector of the target phrases, wherein the first input text vector is different from the second input text vector, and the first input text vector is determined by:
constructing, by the computer device, a dictionary including the target phrases the dictionary listing the target phrases in an order at which each of the target phrases appears in the text; and
generating the first input text vector according to the order and according to a frequency at which the each of the target phrases appears in the text;
inputting, by the computer device, the first input text vector to a first channel of a text classification model and the second input vector to a second channel of the text classification model, wherein the text classification model is obtained through training by using a convolutional neural network (CNN) model, and the text classification model includes a convolutional layer, a pooling layer, and an output layer; and
obtaining, by the computer device, a classification result outputted by the text classification model, and classifying the text according to the classification result.

2. The method according to claim 1, wherein the text classification model further includes an ensemble layer, and inputting the first input text vector and the second input text vector to the text classification model comprises:
using, by the computer device, the convolutional layer for performing a convolution operation on the first or the second text vectors to obtain a first feature matrix, and performing a non-linear operation on the first feature matrix to obtain a second feature matrix;
using, by the computer device, the second feature matrix as an input of the pooling layer, to obtain a third feature matrix;
using, by the computer device, the third feature matrix as an input of the output layer, to obtain a sub-classification parameter; and
using, by the computer device, the sub-classification parameter as an input of the ensemble layer, to obtain the classification result.

3. The method according to claim 1, wherein the first input text vector and the second input text vector are input to the text classification model to respectively generate a first sub-classification parameter corresponding to the first channel and a second sub-classification parameter corresponding to the second channel, and the method further comprises:
determining, by the computer device according to the first sub-classification parameter and the second sub-classification parameter, a first sub-classification result and a second sub-classification result, respectively;
determining, by the computer device, the second sub-classification has a larger output probability than the first sub-classification; and
using, by the computer device, the second sub-classification result as the classification result.

4. A computer device, comprising a memory and a processor, the memory storing a computer-readable instruction, the computer-readable instruction, when executed by the processor, causing the processor to perform:
obtaining target phrases of a text;
determining, a first input text vector and a second input text vector of the target phrases, wherein the first input text vector is different from the second input text vector, and the first input text vector is determined by:

constructing, by the computer device, a dictionary including the target phrases the dictionary listing the target phrases in an order at which each of the target phrases appears in the text; and generating the first input text vector according to the order and according to a frequency at which the each of the target phrases appears in the text;

inputting the first input text vector to a first channel of a text classification model and the second input vector to a second channel of the text classification model, wherein the text classification model is obtained through training by using a convolutional neural network (CNN) model, and the text classification model includes a convolutional layer, a pooling layer, and an output layer; and obtaining a classification result outputted by the text classification model, and classifying the text according to the classification result.

5. The computer device according to claim 4, wherein the text classification model further includes an ensemble layer, and inputting the first input text vector and the second input text vector to the text classification model comprises:

using the convolutional layer for performing a convolution operation on the first and the second text vectors to obtain a first feature matrix, and performing a non-linear operation on the first feature matrix to obtain a second feature matrix;

using the second feature matrix as an input of the pooling layer, to obtain a third feature matrix;

using the third feature matrix as an input of the output layer, to obtain a sub-classification parameter; and using the sub-classification parameter as an input of the ensemble layer, to obtain a final the classification result.

6. The computer device according to claim 4, wherein the first input text vector and the second input text vector are input to the text classification model to respectively generate a first sub-classification parameter corresponding to the first channel and a second sub-classification parameter corresponding to the second channel, and the computer-readable instruction are further executed by the processor to perform:

determining, according to the first sub-classification parameter and the second sub-classification parameter, a first sub-classification result and a second sub-classification result, respectively;

determining, by the computer device, the second sub-classification has a larger output probability than the first sub-classification; and using the second sub-classification result as the classification result.

7. A non-transitory computer readable storage medium storing computer-readable instructions, the computer-readable instructions, when executed by one or more processors, causing the one or more processors to perform:

obtaining, target phrases of a text;

determining, a first input text vector and a second input text vector of the target phrases, wherein the first input text vector is different from the second input text vector, and the first input text vector is determined by:

constructing, by the computer device, a dictionary including the target phrases the dictionary listing the target phrases in an order at which each of the target phrases appears in the text; and generating the first input text vector according to the order and according to a frequency at which the each of the target phrases appears in the text;

inputting the first input text vector to a first channel of a text classification model and the second input vector to a second channel of the text classification model, wherein the text classification model is obtained through training by using a convolutional neural network (CNN) model, and the text classification model includes a convolutional layer, a pooling layer, and an output layer; and obtaining a classification result outputted by the trained text classification model, and classifying the text according to the classification result.

8. The method according to claim 1, wherein the second input text vector reflects a similarity between the target phrases.

9. The method according to claim 1, wherein the first channel is trained by using a convolutional neural network (CNN) model, and the second channel is trained by using a recurrent neural network (RNN) model.

10. The method according to claim 1, wherein the first channel is parallel to the second channel.

11. The method according to claim 1, wherein the first channel and the second channel each includes only one convolutional layer, one pooling layer, and one output layer.

* * * * *